Dec. 9, 1930.  H. A. MONTGOMERY  1,784,743
RECEIVING AND DISPENSING CABINET
Filed April 1, 1929  2 Sheets-Sheet 1

INVENTOR.
Harry A. Montgomery
BY
Alexander Dowell
ATTORNEYS

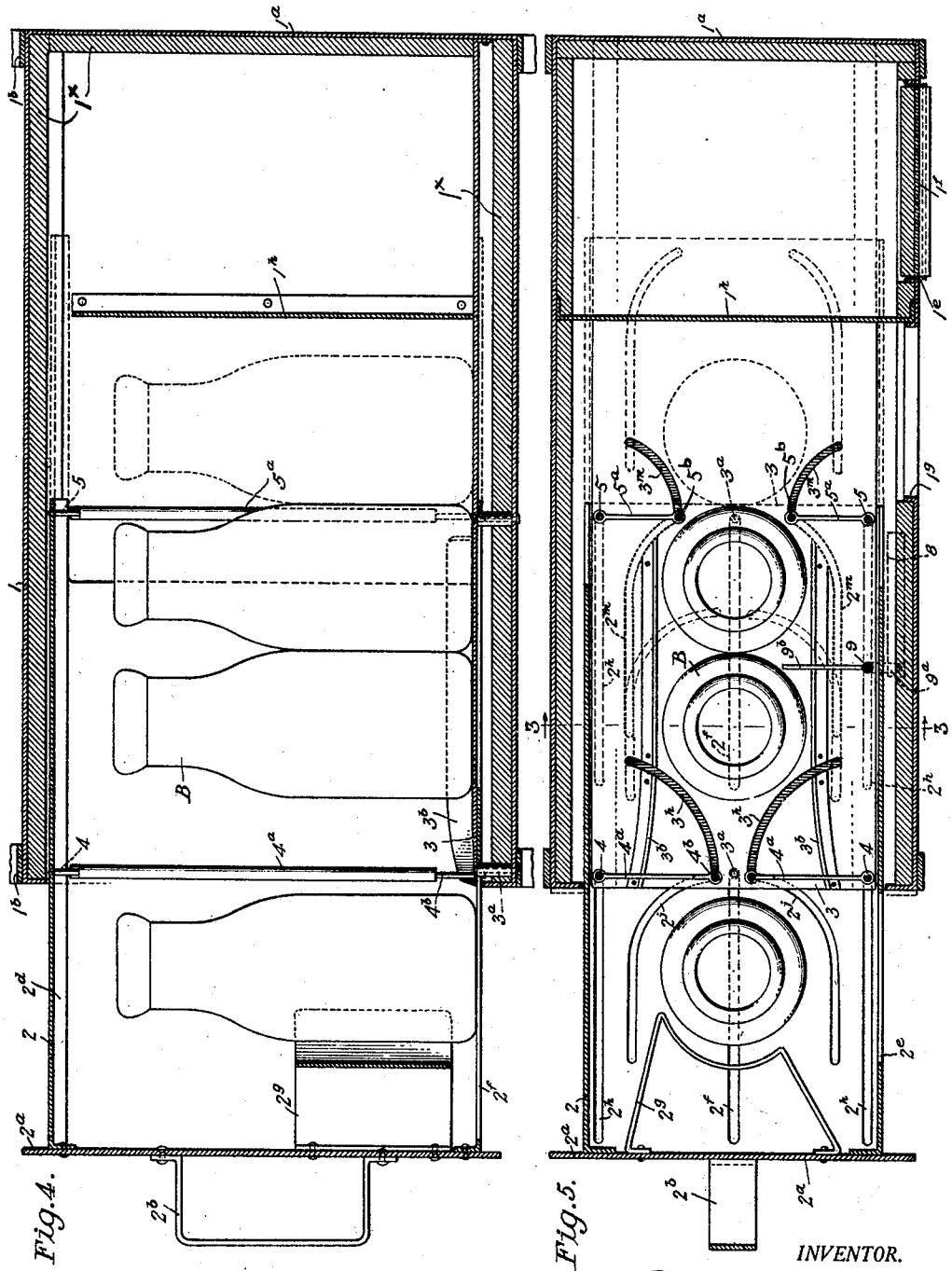

Patented Dec. 9, 1930

1,784,743

UNITED STATES PATENT OFFICE

HARRY A. MONTGOMERY, OF LOUISVILLE, KENTUCKY, ASSIGNOR TO SANI-LOC CABINET COMPANY, OF LOUISVILLE, KENTUCKY, A CORPORATION

RECEIVING AND DISPENSING CABINET

Application filed April 1, 1929. Serial No. 351,752.

This invention relates to improvements in receiving and dispensing cabinets particularly adapted for creamery products; and one object of the invention is to provide a cabinet not only for receiving and dispensing milk bottles, but also for all other creamery products such as butter, eggs, cream, cheese, etc., the cabinet being constructed so as to insure its contents against theft of full or empty milk bottles, etc., and the operation being such that it is necessary to insert an empty bottle therein before a full bottle may be taken from the cabinet, and vice versa.

Another object of the invention is to provide a receiving and dispensing cabinet provided with automatically operated traps which render the contents of the cabinet between the traps inaccessible, making it necessary for the housewife to place an empty bottle in the cabinet before a full bottle may be taken out, and conversely makes it necessary for the milkman to place a full bottle in the cabinet before he can remove an empty bottle.

A further object is to provide a cabinet having a separate compartment with an automatically operated closure for the safe keeping of butter, cheese, cream, etc., the closure being operable by the operation of inserting a bottle in the main or bottle receiving compartment.

A further object is to provide a cabinet so constructed and insulated that its contents will be kept for 4 or 5 hours within a very few degrees of temperature same was when put in, this being accomplished by reason of the fact that the cabinet is lined throughout with a fibre composition, and furthermore by reason of the dead air space between the cabinet walls. When the cabinet is closed it becomes substantially air tight, and guards against heat as well as cold.

Other objects are to provide a cabinet which will keep the milk, etc., in the dark which is very necessary for the preserving of freshness; also a cabinet which will keep the products out of reach of cats, dogs, bugs, and the like.

A still further object is to provide a receiving and dispensing cabinet having very few moving parts in its mechanism, having small likelihood of getting out of order; and a cabinet which once assembled will be practically fool-proof, will be inexpensive to manufacture and operate; also same will be keyless, self-locking, heat-proof, freeze-proof, theft-proof, sanitary, and convenient for use in connection with all products of the dairy, and other standard sized products.

I will explain the invention with reference to the accompanying drawings which illustrate one practical embodiment thereof to enable others familiar with the art to adopt and use the same; and will summarize in the claims the novel features of construction and the novel combinations of parts, for which protection is desired.

In said drawings—

Fig. 4 is a vertical section through the cabinet, opened and showing the milk bottles therein.

Fig. 5 is a horizontal section through the cabinet as shown in Fig. 4.

Figure 1:
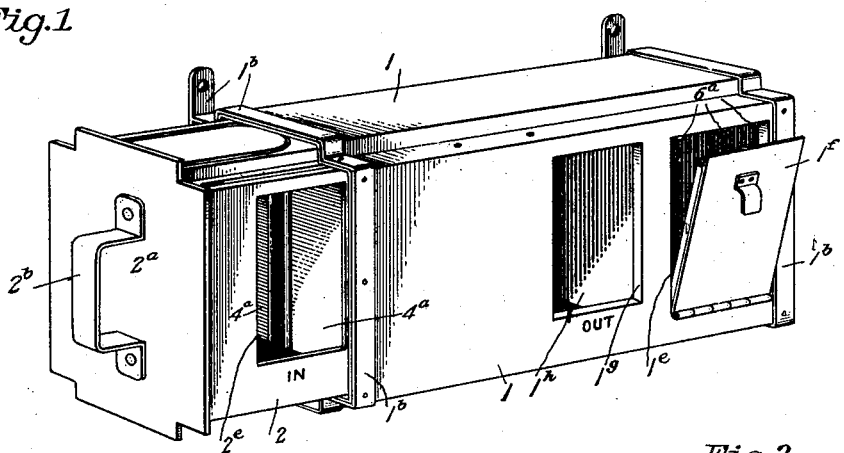
Fig. 1 is a perspective view of cabinet, opened.
Figure 2:
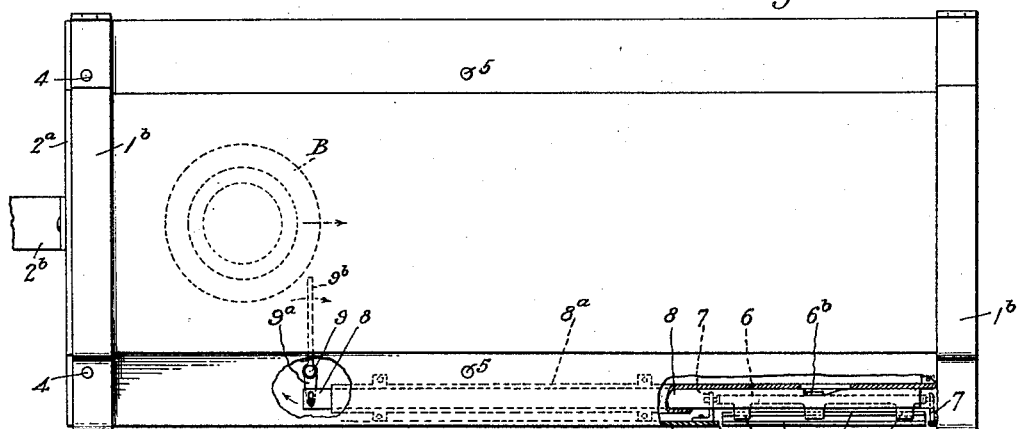
Fig. 2 is an enlarged top-plan view of cabinet, closed; a portion being broken away to illustrate the automatic closure operating means for the butter compartment.

As shown, the cabinet preferably comprises an outer casing 1 of substantially rectangular cross-section, open at one end and closed at the other by an end plate 1a; said outer casing being adapted to house an inner telescoping casing 2, open at its end adjacent end plate 1a, but closed at its outer end by a plate 2a which also closes the open end of outer casing 1 when casing 2 is telescoped into closed position. Hanger straps 1b are provided around the outer casing 1 for securing same to a suitable support; and a handle 2b is provided upon end plates 2a to permit telescopic operation of inner casing 2.

Figure 3:
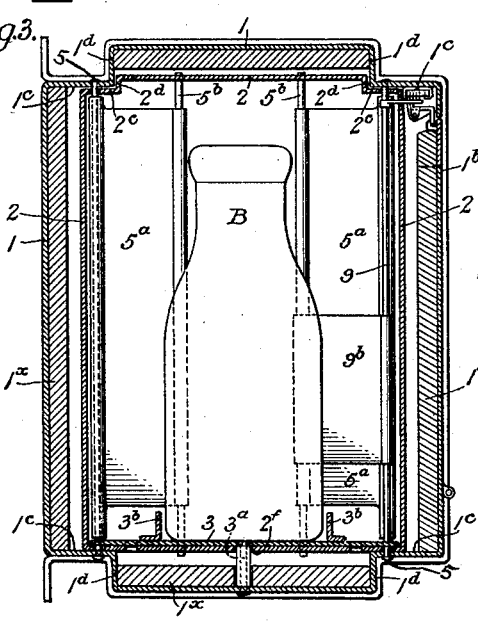
Fig. 3 is a transverse section on the line 3—3, Fig. 5.
Figure 6:
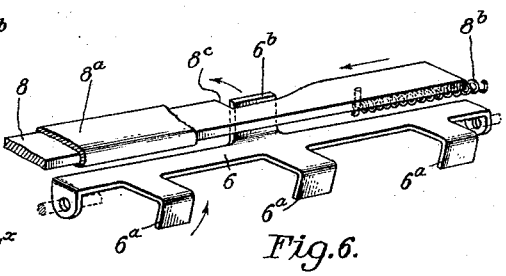
Fig. 6 is an enlarged detail of the dog-plate and sliding cam bar.

Preferably the longitudinal edges of the casing 1 are provided with inwardly extending rectangular offset portions, with the faces 1c, 1d thereof parallel to the opposite walls of the casing, and similarly the upper longitudinal edges of the inner casing 2 are provided with similiar offset portions 2c, 2d. The lower longitudinal edges of inner casing 2 are not provided with offset portions for the reason hereinafter set forth. The interengaging faces of the offset portions of the inner and outer casings 1 and 2 form a guideway for the telescoping casing 2, and as shown in Fig. 3 such construction permits the major portion of casing 1 to be lined with a fibre or other heat insulating composition 1x; and permits the casing 2 to be made sufficiently smaller than casing 1 to allow for a dead air space between the fibre 1x and the major portions of the outer walls of casing 2.

In the front face of casing 1 adjacent the closed end 1a thereof is a rectangular opening 1e, normally closed by a door 1f hinged along the lower edge of the opening, and having means hereinafter described at the upper edge of the opening for automatically locking and unlocking the door. Beside the opening 1e is a second opening 1g large enough to withdraw milk bottles B therethrough, and between the openings 1e, 1g, transversely across the interior of casing 1 is a partition 1h, dividing the casing into two compartments, one for the milk bottles B, and the other for other creamery products such as cheese, butter, eggs, and the like.

Partition 1h extends between the front and rear faces of casing 1 and between the upper and lower horizontal faces 1c of the offset portions of said casing, there being sufficient space left above and below the partition 1h to permit the upper and lower faces of the inner telescoping casing 2 to pass therepast for the purpose hereinafter set forth.

Casing 2 is shorter than casing 1, and due to partition 1h the front and rear faces of casing 2 are cut off in order to permit the casing to fully telescope casing 1. If the butter and cheese compartment were not used then casing 2 could if desired be made the full inside length of casing 1. In the front face of casing 2 is an inlet opening 2e adjacent the end plate 2a thereof, large enough to insert milk bottles therethrough into the interior of the casing 2 when same is pulled out of casing 1 sufficiently to clear the opening 2e which is normally closed by the front face of casing 1 when the parts are in "closed" position. When opening 2e is clear, the inner end of the front face of casing 2 will have also cleared the opening 1g in outer casing 1, which opening 1g is normally closed by the front face of casing 2 when the parts are pushed into "closed" position.

A false-bottom plate 3 is supported within the casing 2 immediately above the bottom of said inner casing, upon pins inserted through two hollow posts 3a disposed on the longitudinal axis of the casing, the pins securely engaging the plate 3 and the bottom face of casing 1, and the hollow posts 3a passing through axial slots 2f in the bottom of casing 2 which slots 2f limit the telescoping movement of said casing and form guides for maintaining the lower end of casing 2 aligned in the casing 1. Plate 3 preferably extends the full length of the casing 1 and may be provided with guides 3b for maintaining the milk bottles B in substantial alignment during their movement through the cabinet. The guides 3b at the outer end of plate 3 are preferably flared slightly outwardly to receive and bring into alignment the bottles B transferred thereon which may not have been properly positioned in the casing 2 through the opening 2e.

The outer edge of plate 3 is feathered down to meet the bottom of casing 2 so as to prevent the bottles B from tipping over when transferred from casing 2 upon the plate 3; the bottles B, when inserted through opening 2e (Fig. 5) and upon subsequent "closing" of the members 1 and 2, being pushed by pusher 2g upon the plate 3. Preferably pusher 2g is arcuate and adapted to fit the curvature of the bottle for initially aligning the bottles upon telescoping the members 1 and 2.

Adjacent the front and rear faces of casing 1 at its open front end are opposed vertical pins 4 having their ends anchored in the offset faces 1c of casing 1, said pins 4 passing through slots 2h in the inner casing 2 so as not to interfere with the telescoping movement of the casings. On each pin 4 is hinged a trap door 4a of substantially half the width of casing 2, the outer edge of plate 4a carrying a vertical arm 4b engaging opposed slots 2j in the upper and lower faces of casing 2 and slots 3h in the false-bottom plate 3, the slots 2j being so shaped that when the casing 2 is closed the opposed trap doors 4a will be swung by engagement of arms 4b with slots 2j so as to separate a sufficient distance apart to permit a milk bottle to pass therebetween and this separation will be maintained due to the curvature of slots 2j until just previous to full exposure of the opening 2e in the casing 2, at which time pins 4b will engage the arcuate portions of slots 2j and suddenly swing the trap doors 4a across the interior of casing 2 preventing withdrawal of a milk bottle B therepast; but the extended portion of casing 2 in front of the closed trap doors 4a forming a milk bottle receiving compartment, the bottles being insertable through the exposed opening 2e.

When casing 2 receives a bottle B and casing 2 is pushed into "closed" position the traps 4a are immediately opened due to the curved portions of slots 2j and the arcuate pusher 2g on the inner face of end plate 2a pushes the bottle B upon the false floor 3 inwardly into the casing 1 a distance sufficiently to clear the swing of trap doors 4a and the bottle B remains in this deposited position even after casing 2 is again pulled "open", at which time the closed traps 4a will be swung shut to prevent withdrawal of the bottle therepast through opening 2e. Each successive bottle B inserted into opening 2e will successively push the line of bottles B already within casing 1 axially inwardly towards the outlet opening 1g.

A second pair of trap doors 5a are arranged on hinge rods 5 adjacent the outlet opening 1g in identically the same manner as traps 4a; the traps 5a being likewise similarly operable by pins 5b operating in slots 2m, in the upper and lower faces of casing 2 and slots 3m in the plate 3, the traps 4a and 5a opening and closing simultaneously by and with the telescoping movement of casing 2. Trap doors 5a are somewhat narrower than doors 4a to allow clearance for the doors to swing shut after a bottle B has been deposited opposite the outlet opening 1g.

In operation, when the interior of casing 1 between the trap doors 4a and 5a is filled with aligned bottles B (Figs. 4 and 5) and the casing 2 pulled open none of the bottles can be reached through either door 1g or 2e because of the closed trap doors 4a and 5a; but if another bottle is inserted through the then open inlet opening 2e and the casing then "closed", the entire line of bottles B will be shifted to bring the innermost bottle opposite outlet opening 1g. Then when the casing 2 is again pulled "open" the inlet compartment will be empty but one bottle B will be accessible through the outlet opening 1g between partition 1h and the closed traps 5a, and only that bottle may be withdrawn until another bottle has again been inserted into opening 2e and the casing 2 again closed and opened. Hence a bottle may be withdrawn from the cabinet only by insertion of another bottle into the cabinet and subsequent manipulation of the casing 2.

This operation also actuates the automatic lock for the cream and butter compartment door 1f as hereinafter explained, which will be a great benefit to the creamery and as the housewife must place her empty bottles in the cabinet in order to get her supplies out, and it is impossible for anyone to take the bottles out of the cabinet without first placing a bottle in the cabinet, thereby eliminating theft.

Along the top of door 1f of the butter compartment is an inwardly extending flange having an up-turned lip 1q adapted to be engaged by dog-catches 6a on a member 6 horizontally pivoted in a bracket 7 secured to the casing 1 over door 1e whereby as door 1f is pushed shut the dogs 6a will engage lip 1q and retain the door in locked position.

A slide bar 8 runs in guides 8a disposed longitudinally of casing 1, said slide 8 being operated by an arm 9a on a rod 9 journaled in casing 1 similarly to and and intermediate the rods 4 and 5 at a position normally between two milks bottles B. A trigger plate 9b on rod 9 normally is disposed between the two bottles, but when the row of bottles B is shifted the trigger 9b will be swung to actuate the slide bar 8, a spring 8b tending to maintain rod 8 in position to throw trigger 9b normally across the casing 1. A cam notch 8c in slide 8 is normally engaged by a rocker arm 6b on member 6 so as to maintain the dogs 6a normaly engaged with lip 1q of door 1f, but when trigger 9b is swung, the slide 8 will be shifted to swing arm 6b raising dogs 6a and releasing the door 1f which swings open. Thus as long as the bottles B in casing 1 are stationary the door 1f will remain closed. Each time a milk bottle is put in opening 2e and casing 2 closed the line of bottles will be shifted operating trigger 9b and permitting door 1f to spring open. Operation of casing 2 without a bottle being placed in the inlet opening 2e however will not shift the bottles B within casing 1 and hence will not spring the lock on the door 1f which will normally remain locked.

When the dairyman places a bottle of milk in the cabinet through opening 2e he takes out an empty—inserts another bottle of milk and withdraws another empty—places the butter etc. in the butter compartments, swings door 1f closed, and goes on his way. The housewife collects the milk by alternately inserting empties in the casing 2 and withdrawing the filled bottles left by the milkman.

The milk and butter is kept at substantially the same temperature it was when put into the cabinet, and is kept in the dark, a very desirable feature; also use of my cabinet will keep the milk out of the reach of cats, dogs, etc. which molest same if left unprotected on door steps. If milk freezes in a bottle it rises above the bottle and the exposed portion is a mecca for microbes; but my cabinet will prevent such freezing if not already frozen when placed in the cabinet.

I do not limit my invention to the exact form shown in the drawings for obviously changes may be made therein, within the scope of the claims; and while I have illustrated my invention in connection with a cabinet especially designed for receiving and dispensing creamery products, viz, milk bottles, I do not limit my cabinet to use for such products only, for obviously the structure and proportions may be varied within the scope of the claims to enable other standard sized articles to be received and dispensed therein.

I claim:

1. A receiving and dispensing cabinet comprising an outer casing having an outlet opening; a telescoping inner casing having an inlet opening; means for aligning articles successively inserted through the inlet opening upon each telescopic operation, each successive article moving the aligned column towards the outlet opening and taking the position of the next preceding article; and automatically operated means for preventing access to the articles between the inlet and outlet openings when uncovered.

2. In a cabinet as set forth in claim 1, interengaging inwardly extending offset portions at the longitudinal edges of said casings, for positioning the casings to form a dead air space therebetween.

3. In a cabinet as set forth in claim 1, said aligning means comprising a stationary false bottom upon which the articles from the inner casing are deposited in succession with each telescopic operation and a member adapted to engage the article in the inlet opening and position the article on said false bottom during the closing telescopic operation.

4. In a cabinet as set forth in claim 1, said automatic means comprising trap doors pivotally mounted within the cabinet between the inlet and outlet openings having portions engaging guides in the inner casing, whereby as the said casing is pushed inwardly the doors will be swung to permit articles to be moved therepast, but when the inner casing is drawn outwardly the doors will be swung into the path of the articles.

5. A receiving and dispensing cabinet comprising an outer casing having an outlet opening; a telescoping inner casing having an inlet opening; means for retaining in alignment articles successively inserted through the inlet opening upon each telescopic operation, each successive article moving the aligned column towards the outlet opening and taking the position of the next preceding article; and sets of automatically operated traps for preventing access to the articles between the inlet and outlet openings when uncovered while permitting access to the article directly opposite the outlet opening; thereby necessitating successive insertion of other articles through the inlet opening and successive operation of the casings to withdraw the articles in succession from between the openings.

6. In a cabinet as set forth in claim 5; interengaging inwardly extending offset portions at the longitudinal edges of said casings for positioning the casings to form a dead air space between the inner and outer casings when fully telescoped.

7. In a cabinet as set forth in claim 5, said article aligning means comprising a stationary false bottom upon which the articles from the inner casing are deposited in succession with each telescopic operation; and a member adapted to engage the article in the inlet opening and position same on the false bottom during the telescopic operation.

8. In a cabinet as set forth in claim 5, said automatic traps comprising doors pivotally mounted within the cabinet between the inlet and outlet openings, and having pins on their free ends engaging slots in the inner casing whereby as the said casing is fully telescoped the doors will be swung to permit articles to be moved therepast, but when the inner casing is drawn outwardly to uncover the inlet and outlet openings the doors will be swung across the cabinet.

9. A receiving and dispensing cabinet comprising an outer casing open at one end and having an outlet opening adjacent its closed end; an inner casing telescopically entering the open end of said outer casing and having its inner end open and its outer end closed, and having an inlet opening adjacent its closed end; means for retaining in alignment articles inserted in succession through the inlet opening upon each telescopic operation of the casings; each successive article moving the column of aligned articles toward the outlet opening and taking the position of the next preceding article; and means automatically operated by the telescoping operation for preventing access to the articles between the inlet and outlet openings when uncovered, while permitting the article directly opposite the outlet opening to be withdrawn therethrough, whereby the articles may be successively withdrawn through the outlet opening only by inserting other articles in succession through the inlet opening and telescoping the casings.

10. In a cabinet as set forth in claim 9; a heat insulating lining within the outer casing; and interengaging guide portions for maintaining a dead air space between the inner casing and the insulating lining when fully telescoped, said guide portions comprising inwardly extending offset shoulders at the longitudinal edges of the casings.

11. In a cabinet as set forth in claim 9, said article aligning means comprising a stationary false bottom upon which the articles from the inner casing are deposited in succession with each telescopic operation; and a member conforming with the shape of the articles adapted to engage the article in the inlet opening and position the article placed on the false bottom during the telescoping operation.

12. In a cabinet as set forth in claim 9, said automatic means comprising trap doors pivotally mounted within the cabinet between the inlet and outlet openings, and having portions engaging slots in the inner casing whereby as the said casing is fully telescoped the doors will be swung to permit articles to move therepast, but when the inner casing is drawn outwardly to uncover the inlet and outlet openings the doors will be swung across the cabinet.

13. In combination with a cabinet as set forth in claim 9, a separate compartment adjacent the closed end of the outer casing having an opening; a door normally closing said opening; a latch normally maintaining the door locked; and trigger means disposed between the inlet and outlet openings and operable by contact with the moving column of articles for unlatching the lock.

14. In a cabinet of the character described, an outer casing having an outlet; a telescoping inner casing having an inlet; a stationary false bottom within the inner casing; and trap doors within the inner casing pivoted on posts journaled in the outer casing between the inlet and outlet openings, said doors having actuating portions on their free ends engaging guides in the inner casing, whereby as the inner casing is moved from protracted to projected positions the doors will be respectively swung from opened to closed positions.

15. In a cabinet as set forth in claim 14, said inner casing being slotted in way of the pivot posts of the trap doors, and said false bottom being slotted in way of the actuating portions of the trap doors.

16. In a cabinet of the character described, an outer casing having an outlet; a telescoping inner casing having an inlet; a stationary false bottom within the inner casing mounted on posts secured to the outer casing, and the inner casing being slotted in way of said posts; and trap doors within the inner casing pivoted on rods journaled in the outer casing between the inlet and outlet openings, and having actuating pins on their free ends engaging slots in the inner casing, the inner casing being slotted in way of the pivot rods of the trap doors whereby as the inner casing is moved from protracted to projected positions the traps will be swung from opened to closed position.

17. A receiving and dispensing cabinet comprising a casing having a transverse partition and having one end open, and having an opening at one side of the partition; a hinged closure for the opening; a latch normally maintaining the closure shut; means in the open end of the casing for successively moving articles inwardly in an aligned column towards the partition, when articles are inserted in the open end of the casing in succession; and means operable by contact with the moving column for springing the latch; thereby necessitating insertion of an article into the open end of the casing and movement of the column before the closure may be opened.

18. In a cabinet as set forth in claim 17, said moving means comprising an inner casing telescopically engaging the open end of the outer casing, and having an inlet opening; and a stationary false bottom in the inner casing for retaining articles successively inserted through the inlet opening upon each full telescopic operation of the casings, each successive article taking the position of the next preceding article and moving the columns already on the false bottom inwardly one position.

19. In a cabinet as set forth in claim 17, latch springing means comprising a pivoted trigger normally yieldably disposed intermediate adjacent articles in the column; a slide bar operated by the trigger and having a cam portion lying adjacent the latch whereby when the trigger is in normal position the latch will remain closed, but when the trigger is swung the bar will be shifted and the cam portion will release the latch.

HARRY A. MONTGOMERY.